United States Patent
Stefani et al.

(10) Patent No.: US 9,274,521 B1
(45) Date of Patent: Mar. 1, 2016

(54) EMPLOYING LOCAL, OPPORTUNISTIC AUTOMATIC DEPENDENT SURVEILLANCE-BROADCAST (ADS-B) INFORMATION PROCESSED BY AN UNMANNED AERIAL VEHICLE GROUND CONTROL STATION TO AUGMENT OTHER SOURCE "KNOWLEDGE" OF LOCAL AIRCRAFT POSITION INFORMATION FOR IMPROVING SITUATIONAL AWARENESS

(71) Applicant: ROCKWELL COLLINS, INC., Cedar Rapids, IA (US)

(72) Inventors: Rolf R. Stefani, West River, MD (US); James Gary Cooper, Jr., Annapolis, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/612,273

(22) Filed: Feb. 2, 2015

(51) Int. Cl.
| | |
|---|---|
| G05D 1/10 | (2006.01) |
| B64C 39/00 | (2006.01) |
| G08G 5/00 | (2006.01) |
| G05D 1/00 | (2006.01) |
| G06K 9/46 | (2006.01) |
| B64C 39/02 | (2006.01) |

(52) U.S. Cl.
CPC ............ *G05D 1/0022* (2013.01); *B64C 39/024* (2013.01); *G05D 1/0044* (2013.01); *G06K 9/4604* (2013.01); *G08G 5/0013* (2013.01)

(58) Field of Classification Search
CPC . G05D 1/0022; G05D 1/0044; G06K 9/4604; B64C 39/024; G08G 5/0013
See application file for complete search history.

(56) References Cited

U.S. PATENT DOCUMENTS

| | | |
|---|---|---|
| 7,961,136 B2 | 6/2011 | Stefani et al. |
| 8,886,459 B2 | 11/2014 | Stefani et al. |

(Continued)

OTHER PUBLICATIONS

"ADS-B for Small Unmanned Aerial Systems: Case Study and Regulatory Practices"; Stark et al.; Unmanned Aircraft Systems (ICUAS), 2013 Intl. Conf.; May 28-31, 2013; pp. 152-159.*

(Continued)

*Primary Examiner* — Michael J Zanelli
(74) *Attorney, Agent, or Firm* — Ronald E. Prass, Jr.; Prass LLP

(57) ABSTRACT

A system and method are provided for employing local, opportunistic Automatic Dependent Surveillance-Broadcast (ADS-B) information to augment other source "knowledge" of local aircraft position information for improving situational awareness in areas lacking ADS-B coverage provided by other aircraft control agencies including the Federal Aviation Administration (FAA), other Civil Aviation Authorities (CAAs), and/or other Air Traffic Control (ATC) entities. Locally-received, e.g., in a vicinity of a UAV or sUAS, ADS-B positional information is received by a UAV, sUAS or associated ground control station and integrated on a display component of the ground control station, e.g., a pilot display, for the UAV or sUAS. Received positional information is forwarded to other interested users/systems, including those associated with agencies or entities in overall tactical, operational or surveillance control of a particular area of operations, as appropriate as an integrated situational awareness map display picture.

21 Claims, 4 Drawing Sheets

(56) References Cited

U.S. PATENT DOCUMENTS

| | | | | |
|---|---|---|---|---|
| 2009/0316755 | A1* | 12/2009 | Collette | G05D 1/0044 375/133 |
| 2010/0066604 | A1* | 3/2010 | Limbaugh | G08G 5/0013 342/357.31 |
| 2012/0143482 | A1* | 6/2012 | Goossen | G08G 5/0034 701/120 |
| 2014/0028485 | A1* | 1/2014 | Nordlie | G01S 7/003 342/36 |
| 2014/0197981 | A1* | 7/2014 | Hartley | G01S 13/74 342/37 |

OTHER PUBLICATIONS

An Approach to Assess the Safety of ADS-B based Unmanned Aerial Systems; Sesso et al.; Unmanned Aircraft Systems (ICUAS), 2014 Intl. Conf.; May 27-30, 2014; pp. 669-676.*
U.S. Appl. No. 13/792,259 to Stefani et al., filed Mar. 11, 2013.
U.S. Appl. No. 14/318,569 to Stefani et al., filed Jun. 27, 2014.

* cited by examiner

EMPLOYING LOCAL, OPPORTUNISTIC AUTOMATIC DEPENDENT SURVEILLANCE-BROADCAST (ADS-B) INFORMATION PROCESSED BY AN UNMANNED AERIAL VEHICLE GROUND CONTROL STATION TO AUGMENT OTHER SOURCE "KNOWLEDGE" OF LOCAL AIRCRAFT POSITION INFORMATION FOR IMPROVING SITUATIONAL AWARENESS

BACKGROUND

1. Field of the Disclosed Embodiments

This disclosure relates to systems and methods for employing local, opportunistic Automatic Dependent Surveillance-Broadcast (ADS-B) information to augment other source "knowledge" of local aircraft position information for improving situational awareness in areas lacking ADS-B coverage provided by other aircraft control agencies.

2. Related Art

Deployment scenarios involving unmanned aerial vehicles are increasing as the technology for local and remote control of those vehicles increases, and as government, law enforcement and other entities become aware of, and comfortable with, the capabilities and benefits of routinely employing certain unmanned aerial vehicles for certain mission types. The term "unmanned aerial vehicle(s)," as that term will be used throughout this disclosure, is intended to encompass a particular class of locally, generally line-of-sight, operated flying vehicles, including Unmanned Aerial Vehicles (UAVs) and the related Small Unmanned Aerial Systems (sUASs).

Based on an anticipated exponential growth in the employment scenarios of particularly sUAS platforms, given their relative low cost, flexibility of employment and expanding capabilities, the discussion below will center around sUAS platform deployment and operating scenarios. This focus on such operations as a specific example to illustrate the benefits of the systems and methods according to this disclosure should not be construed as excluding equally germane application to all classes of unmanned aerial vehicles. The sUAS platforms referred to in this disclosure are capable of controlled flight from launch, through in-flight operations, to recovery and/or landing in a manner similar to a conventional manned aircraft or helicopter. The control schemes for these sUAS platforms may include real-time or near-real-time control of the flight profile by an operator (pilot or pilot/observer team) at a communication and control console ground control station or GCS in constant communication with a particular sUAS. The described sUAS platforms referred to in this disclosure tend to be of limited sophistication, thereby requiring local control by an operator having line-of-sight contact with a particular sUAS platform. These operating limitations, while providing for reasonable flight safety, limit a capacity of the systems to be integrated into a broader aerial vehicle/aircraft deconfliction scheme.

A focus of development efforts for a broad array of unmanned aerial vehicles is centered on exploring operation of small, economical aerial vehicle platforms (sUAS) that may be specifically fielded to a particular task to which the unmanned aerial vehicles may be adapted. A number of competing entities have evolved their operations to providing differing levels of sophistication in sUAS platforms to support specific and evolving requirements of a broadly expanding potential customer base, including government agencies and law enforcement entities. Currently, sUAS platform capabilities are being expanded for deployment in increasing roles in many public service and public support missions, which include, but are not limited to, border surveillance, wildlife surveys, military training, weather monitoring, fire detection and monitoring, and myriad local law enforcement surveillance support missions.

A challenge to increasingly expanded employment of sUAS platforms generally in many domestic, non-military scenarios, particularly in the United States, stems from platforms not having aircrew onboard that are able (1) to detect other close and/or conflicting aerial traffic and/or (2) to effect timely maneuvers to avoid collisions based on visual- or sensor-detected proximity to such conflicting aerial traffic.

Local employment of a particular unmanned aerial vehicle tends to be autonomous. Currently, the local operator of the unmanned aerial vehicle, for example, may be generally unaware with other aerial operations in the area. As capabilities expand, the sUAS operator may be provided certain rudimentary traffic deconfliction information, but is generally only limitedly aware of other operations in a vicinity, and is generally afforded only limited capacity to coordinate or deconflict own ship operations with the operations of other sUAS platform operators in the area, and/or with local manned aircraft operations. In this regard, the immediate operation of a particular sUAS platform may be considered local, tactical employment of the particular platform. This scenario is operationally played out when one considers that the operator of the sUAS platform is in a fixed location within line of sight to the sUAS platform providing control inputs to the sUAS platform from the GCS based on observed operations of the sUAS platform, potentially augmented by an actual video feed from the sUAS platform being displayed on a display component of the GCS to aid in locally controlling mission employment of the sUAS platform.

SUMMARY OF THE DISCLOSED SUBJECT MATTER

As the role of sUAS platforms expands, there is a growing potential for these platforms to be involved in serious safety-related incidents, including near and actual midair collisions with other sUAS platforms and/or conventional aircraft operating in close proximity to an sUAS platform in both controlled and uncontrolled airspace environments. An issue that must be very aggressively addressed is an ability to provide better situational awareness to the local sUAS platform operator. Traffic detection and avoidance challenges that are presented based on the lack of an onboard pilot to see and avoid other aircraft, and the wide variation in sUAS missions and capabilities can be addressed through intelligent adaptation and employment of known systems to enhance a local situational awareness display for the operator of the sUAS platform.

With expanding sUAS platform employment, it is anticipated that single platform operational scenarios will very quickly give rise to multiple platform operating scenarios in which efforts and movements of individual sUAS platforms and their operators will reasonably need to be effectively coordinated for safety and mission accomplishment.

In support of operational deconfliction, it would be advantageous to provide each operator with enhanced situational awareness regarding other aerial traffic, manned and unmanned, in an operating area at the sUAS pilot's local sUAS ground control station. It is anticipated that enhanced situational awareness by all local participants will lead to better coordination through operator-to-operator communication as each is kept aware of the presence of other sUAS operations, and of potentially conflicting manned aircraft operations, in a local area.

It would be advantageous to enhance the capacity to provide to the sUAS operator a situational awareness overlay of all aerial operations in a particular operating area, including details regarding the operations of one or more unmanned aerial vehicles in the particular operating area as well as providing information regarding manned aircraft through and in the vicinity of the particular operating area. Such a capability may enhance flight safety and afford an opportunity for operational coordination to optimize the support provided by the coordinated employment of the manned aircraft and unmanned aerial vehicles at a particular time and in a particular place.

Exemplary embodiments of the systems and methods according to this disclosure may provide for the use of local, opportunistic Automatic Dependent Surveillance-Broadcast (ADS-B) information to augment knowledge of local aircraft position information for the purpose of improving situational awareness of all operators, and particularly operators of sUAS platforms in areas lacking ADS-B coverage provided by the Federal Aviation Administration (FAA), other Civil Aviation Authorities (CAAs), and/or other Air Traffic Control (ATC) entities.

Exemplary embodiments may provide for locally-received, e.g., in a vicinity of a UAV or sUAS, positional information received by a UAV, sUAS or associated ground control station can be integrated on a display component of the ground control station, e.g., a pilot display, for the UAV or sUAS.

Exemplary embodiments may provide an opportunity or capacity to share the received positional information with other interested users/systems, including those associated with agencies or entities in overall tactical, operational or surveillance control of a particular area of operations, as appropriate.

Exemplary embodiments may provide the unmanned vehicle operators (pilots or pilot/observer teams) with a capability to leverage Automatic Dependent Surveillance-Broadcast (ADS-B) information in a uniquely cooperative manner.

Exemplary embodiments may provide systems and methods by which an sUAS ground control station is outfitted with an ADS-B receiver capable of receiving ADS-B signals (typically both 1090 MHz and 978 MHz ADS-B signals, the 1090 MHz signal carrying 1090 Extended Squitter (ES) traffic, and the 978 MHz signal carrying 978, or UAT (Universal Access Transceiver), traffic). In embodiments, the ground control station may receive local, opportunistic ADS-B position reports over 1090 ES and 978 UAT and fuse those position reports with received telemetry of the sUAS under command of the ground control station.

Exemplary embodiments may integrate a small and lightweight ADS-B receiver on the body of the sUAS, the ADS-B receiver transmitting local received traffic information to the ground control station to be integrated as well.

Exemplary embodiments may fuse position reports of local aircraft operating in the area and the sUAS telemetry from the locally-controlled aerial vehicle and forward that fused data to a remote server running software that may, for example, archive the received fused data for later replay, and/or may otherwise provide a remote graphical map display of one or many sUAS platforms and local aircraft operating in a particular area.

In embodiments, an addition of ADS-B information to sUAS position information may provide mission controllers, air traffic controllers, or other stakeholders a more accurate integrated view of a particular airspace during sUAS missions thereby affording those stakeholders significantly increased situational awareness.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for employing local, opportunistic ADS-B information to augment other source "knowledge" of local aircraft position information for improving situational awareness in areas lacking ADS-B coverage provided by other aircraft control agencies, will be described, in detail, with reference to the following drawings, in which.

DESCRIPTION OF THE DISCLOSED EMBODIMENTS

Figure 1:
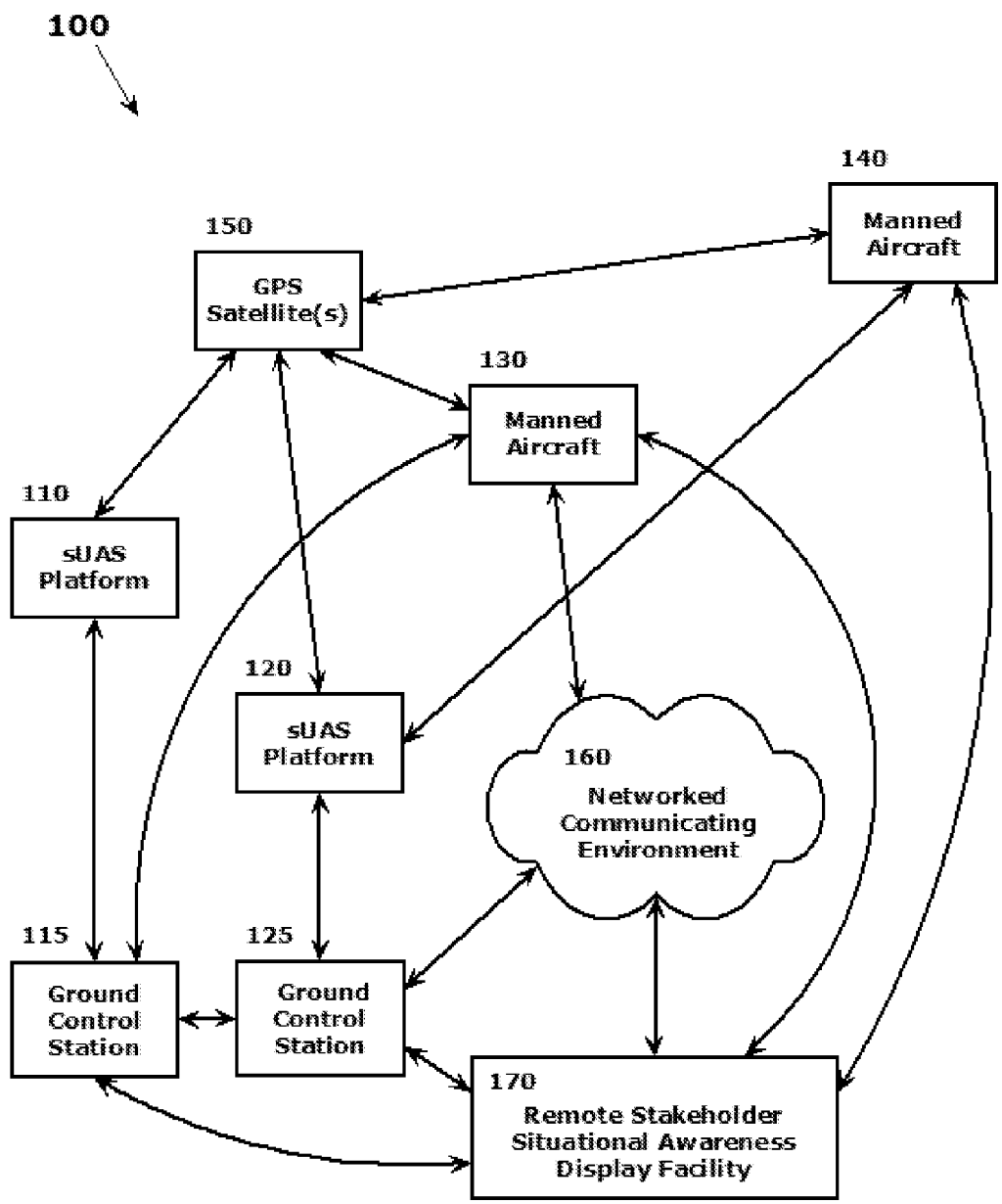
FIG. 1 illustrates an exemplary embodiment of an operating environment with a communication network in which ADS-B supplemented tracking schemes according to this disclosure may be implemented.

The disclosed systems and methods for employing local, opportunistic ADS-B information to augment other source "knowledge" of local aircraft position information for improving situational awareness in areas lacking ADS-B coverage provided by other aircraft control agencies will generally refer to this specific utility for those systems and methods. Exemplary embodiments described and depicted in this disclosure should not be interpreted as being specifically limited to any particular configuration of an unmanned aerial vehicle, including any particular small unmanned aircraft or aerial platform system (sUAS platform), or to any particular cooperating communication and control console (ground control station or GCS) by which a vehicle operator (pilot or pilot/observer team), generally in line-of-sight proximity and communication with the unmanned aerial vehicle, provides command, control and communication (C3) services with respect to operation of the unmanned aerial vehicle. Any advantageous use of an interactive communication and control scheme that leverages the use of available ADS-B data from participating sUAS platforms and participating manned aircraft to provide the sUAS pilot and/or a remote stakeholder with enhanced operating area knowledge and situational awareness is contemplated. An objective is to achieve increased flight safety and operational deconfliction regarding positioning and operations of one or more unmanned aerial vehicles apart from other activities in a vicinity of the one or more unmanned aerial vehicles, and the capacity to provide an overall mission picture to a remote stakeholder based on fused data in a streamlined graphically-based communication mechanism.

The systems and methods according to this disclosure will be described as being particularly adaptable to employment scenarios for, and configurations of, sUAS platforms in which the aerial vehicles are flown by operators with a cooperating GCS. These references are meant to be illustrative only in providing a single real-world utility for the disclosed systems and methods, and should not be considered as limiting the disclosed systems and methods in any way. Additional features and advantages of the disclosed embodiments will be set forth in the description that follows, and in part will be obvious from the description, or may be learned by practice of the disclosed embodiments. The features and advantages of the disclosed embodiments may be realized and obtained by means of the instruments and combinations particularly pointed out in the appended claims.

Various embodiments of the disclosed systems and methods are discussed in detail below. While specific implementations are discussed, it should be understood that this is done for illustration purposes only. A person skilled in the relevant art will recognize that other components and configurations may be used without departing from the spirit and scope of the disclosed embodiments.

Those of skill in the art recognize that ADS-B represents a cooperative surveillance technology in which an aircraft (1) determines its (own ship) position by satellite navigation (GPS) and other related flight information from other onboard radios, data collection and/or geolocation systems, and (2) periodically broadcasts the own ship position to cooperating ADS-B receivers enabling the aircraft to be tracked in real time or near-real time. The positional information may be received by ATC ground stations or by others with ADS-B receivers, and is generally considered and implemented as a replacement for secondary radar for aircraft tracking and position keeping. ADS-B generated aircraft positional information may be received by other cooperating aircraft to provide situational awareness in aircraft operating proximately to one another in support of traffic separation, conflict avoidance and overall flight safety.

The disclosed schemes advantageously employ systems and methods by which an sUAS ground control station may be outfitted with an ADS-B receiver capable of receiving both 1090 MHz and 978 MHz ADS-B signals. The 1090 MHz signal carries what is commonly referred to 1090 Extended Squitter (ES) traffic, while the 978 MHz signal carries what is commonly referred to as 978 and/or Universal Access Transceiver (UAT) traffic. Generally, 1090 ES is accepted inside the US for altitudes above 18,000 feet (and internationally for all altitudes). ES receivers detect other aircraft with ES transmitters air-to-air, and receive other traffic information uplinked from ADS-B-equipped ground stations. A limitation of 1090 ES is that this ADS-B signal provides no weather data link. 978 UAT is only available in the US, and only for altitudes below 18,000 feet. As with 1090 ES receivers, 978 UAT receivers can detect other airplanes with transmitters on the same frequency air-to-air and also receive other traffic information uplinked from ADS-B equipped ground stations. Weather information may also be transmitted over 978 MHz for certain participating aircraft.

According to the disclosed schemes, an sUAS GCS may be configured (1) to receive local, opportunistic ADS-B position reports over 1090 ES and 978 UAT and (2) to fuse those position reports with the sUAS system generated telemetry information for the sUAS platform under command of the GCS. In embodiments, separately or additionally, a small and/or lightweight ADS-B receiver may be mounted in or on the sUAS platform itself. In such configurations, the sUAS platform-mounted ADS-B receiver may receive ADS-B information from locally-participating manned aircraft in a vicinity of the sUAS platform and, in turn, transmit local received aircraft traffic information to the GCS for data integration (fusion) as well. Locally-fused position reports for the aircraft operating in the vicinity of the sUAS platform may be integrated with telemetry information regarding the operation of the sUAS platform locally from the GCS. This integrated information regarding sUAS platform and manned aircraft operations in a particular location may be formatted and forwarded to a remote server running software that may archive the integrated information for later replay (including for incident reconstruction), and otherwise or additionally may command display of the integrated information on a graphical map display of one or more sUAS platforms and participating local manned aircraft in a vicinity of the one or more sUAS platforms. The addition of ADS-B information for manned aircraft operations to sUAS position (telemetry) information may objectively provide mission controllers, air traffic controllers, or other relevant stakeholders with a more accurate view of the airspace in a vicinity of the sUAS platform during sUAS platform operational mission tasking and to provide all involved individuals with a more robust situational awareness picture.

The disclosed schemes are intended to add one or more capabilities to the GCS component of the sUAS system and/or to a remote server with which one or more such GCSs may be in communication for mission monitoring. The added one or more capabilities may be varyingly catalogued as follow:

The GCS may be configured with one or more devices to receive 1090 ES ADS-B messages directly in the GCS. A 1090 MHz receiver may, for example, be physically and/or communicatively attached to the GCS.

The GCS may be configured with one or more devices to receive 978 UAT

ADS-B messages directly in the GCS. A 978 MHz receiver may, for example, be physically and/or communicatively attached to the GCS.

The GCS may be configured with one or more devices to receive 1090 ES ADS-B messages from a 1090 MHz receiver mounted on, or otherwise attached to, the sUAS platform that is controlled by the GCS.

The GCS may be configured with one or more devices to receive 978 UAT ADS-B messages from a 978 MHz receiver mounted on, or otherwise attached to, the sUAS platform that is controlled by the GCS.

The GCS may be configured with hardware, software or firmware that may be usable to decode both ADS-B message types to extract positional information regarding aircraft operating in a vicinity of the GCS-controlled sUAS platform in a particular local area.

The GCS may be further configured with hardware, software or firmware that may be usable (1) to format the positional information obtained from the decoded ADS-B messages, (2) to combine the positional information obtained from the decoded ADS-B messages with telemetry from the GCS-controlled sUAS platform, and (3) to forward all positional information to a remote server. The forwarding of all of the positional information to the remote server may be implemented, using, for example, Web Services including HTTP/HTTPS over TCP/IP.

The remote server may be configured with hardware, software or firmware to integrate the ADS-B position information and the sUAS platform telemetry information received from the one or more GCSs into one or more graphical display map formats to be communicated to GCS operators/pilots, mission controllers, or other stakeholders. Formatting of the integrated ADS-B position information and the sUAS platform telemetry information received from one or more GCSs may be undertaken by the remote server to provide the integrated information as a direct input into the GCS display, or a situational awareness display of the mission controller or the stakeholder, in a format that is supported by the respective display without a need for further translating or formatting.

The remote server may be further configured with hardware, software or firmware to archive all received information for auditing purposes and/or for replaying at a later time for, for example, incident review or reconstruction.

All communications between the GCS and the remote server may be according to a specified set of specialized Web Services using HTTP/HTTPS over TCP/IP. The involved communications network via which the communications are transmitted and received between the GCS and the remote server may include one or the open Internet or a private network. The Web Services may be hosted on one or more secure servers on a public network or on a private network.

In embodiments, the GCS may communicate ADS-B position information and sUAS platform position information using mobile (3G/4G/LTE) devices. These mobile devices may be attached to the GCS, or supplied as, for example, mobile wireless routers having a Wi-Fi or other wireless protocol communicating capability, or Ethernet from the GCS to a mobile carrier backhaul. Any suitable IP communications method may conceivably be used. The communication paths between the GCS and the remote server may include terrestrial-to-terrestrial communication paths and/or may involve satellite-involved communications links.

FIG. 1 illustrates an exemplary embodiment of an operating environment 100 with a communication network in which ADS-B supplemented tracking schemes according to this disclosure may be implemented. As shown in FIG. 1, the exemplary operating environment 100 may include a plurality of unmanned aerial vehicles in a form of, for example, sUAS platforms 110, 120. Each of the sUAS platforms 110, 120 may be respectively controlled by a ground control station or GCS 115, 125. Each of the GCSs 115, 125 may communicate with the respective sUAS platform 110, 120 additionally for data exchange with the respective sUAS platform 110, 120. As shown, each of the GCSs 115, 125 may also be configured to communicate with the others of the GCSs 115, 125 and/or with a remote stakeholder situational awareness display facility 170, and directly, or via some manner of network communicating environment 160.

The exemplary operating environment 100 may also include one or more participating manned aircraft 130, 140. As is noted in some detail above, the disclosed schemes are intended to provide ADS-B receivers on one or more of the GCSs 115, 125 and/or on one or more of the sUAS platforms 110, 120 controlled by the one or more GCSs 115, 125 in order that ADS-B position information provided from the one or more participating manned aircraft 130, 140 may be collected and manipulated within one or more of the GCSs 115, 125. ADS-B information collected by one or more ADS-B receivers mounted on one or more of the sUAS platforms 110, 120 and/or on one or more of the GCSs 115, 125 may be collected and fused within the one or more GCSs 115, 125 and integrated with sUAS platform telemetry information for the respective sUAS platforms 110, 120 controlled by the GCSs 115, 125 to provide a single consolidated position information input to be shared (1) between the GCSs 115, 125, (2) with the participating manned aircraft 130, 140 and/or (3) with the remote stakeholder situational awareness display facility 170 to be displayed and/or archived in the manner discussed above.

Figure 2:
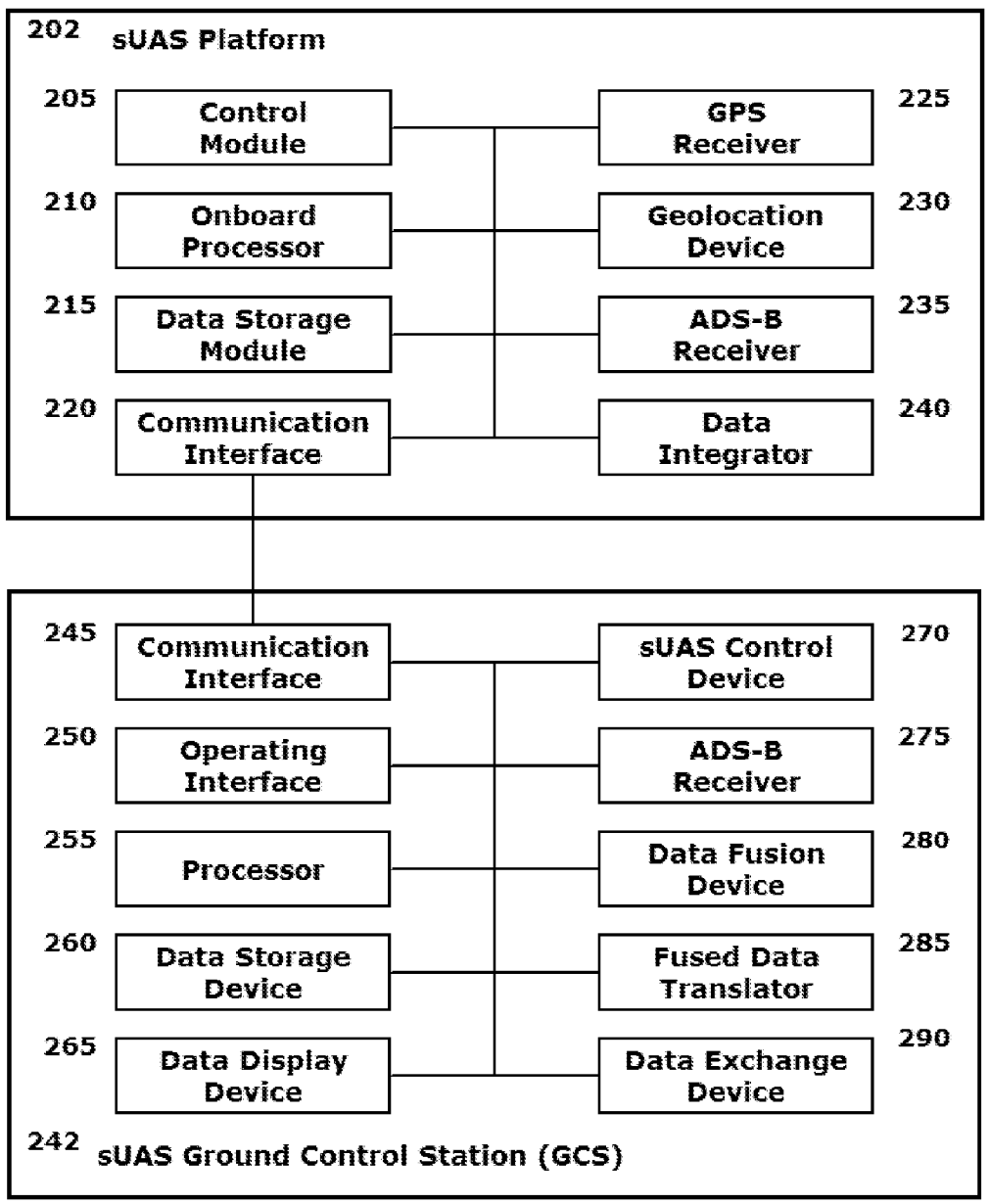
FIG. 2 illustrates an exemplary embodiment of an sUAS system that is usable as a central component of a communication network in which the ADS-B supplemented tracking schemes according to this disclosure may be implemented.

FIG. 2 illustrates an exemplary embodiment of an sUAS system 200 that is usable as a component of a communication network in which the ADS-B supplemented tracking schemes according to this disclosure may be implemented. The exemplary sUAS system 200 includes an sUAS platform 202 and an sUAS GCS 242 for controlling the sUAS platform 202.

The sUAS platform 202 may include a control module 205 by which physical operation and manipulation of a flight path of the sUAS platform 202 is controlled. Control inputs may be received and interpreted by an onboard processor 210 via a communication interface 220 that allows the sUAS GCS 242 to communicate wirelessly with the sUAS platform 202 in flight. Certain operating characteristics may be stored in a data storage module 215 that may be accessed by the onboard processor 210 in response to the control inputs in order to execute the flight operations of the sUAS platform 202 using the control module 205.

The sUAS platform 202 may include a GPS receiver 225, or another geolocation device 230, by which the sUAS platform 202 may be able to determine an own ship geographic and/or geo-located position. The determined own ship position may be converted to transmittable data in the onboard processor 210 and communicated to the sUAS GCS 242 via the communication interface 220 in the sUAS platform 202.

The sUAS platform 202 may include an onboard, or otherwise attached (mounted), small and/or lightweight ADS-B receiver 235 that may be usable to collect ADS-B information on both reporting frequencies, as discussed in detail above, to discern position information for cooperating manned aircraft equipped with ADS-B transceivers operating in a vicinity of the sUAS platform 202. In embodiments in which the ADS-B receiver 235 is mounted on the sUAS platform 202, an onboard data integrator 240 in a form of a hardware circuit, executable software instructions, or firmware, may be included to provide rudimentary integration of position data for the sUAS platform 202 and ADS-B data collected from cooperating manned aircraft in a vicinity of the sUAS platform 202. This integrated data may be manipulated and/or formatted in the onboard processor 210, which, in turn, may direct exchange of the integrated data with the sUAS GCS 242 through the communication interface 220.

The sUAS GCS 242 may include a communication interface 245 by which the sUAS GCS 242 communicates with the sUAS platform 202 for controlling a flight profile of the sUAS platform 202 and for exchanging data with the sUAS platform 202.

The sUAS GCS 242 may include an operating interface 250 by which a local operator (pilot) may enter information to (1) communicate with, and control, the sUAS platform 202, and/or (2) communicate with the other sUAS GCSs and/or remote mission controllers and other stakeholders in, for example, a remote stakeholder situational awareness display facility (see FIG. 1). The operating interface 250 may be a part, or a function, of a graphical user interface (GUI) mounted on, integral to, or associated with, the sUAS GCS 242. The operating interface 250 may alternatively take the form of any commonly-known user-interactive device by which user data inputs and/or user commands are input to an automated processing system including, but not limited to, a keyboard or a touchscreen, a mouse or other pointing device, a microphone for providing verbal commands, or any other commonly-known operating interface device.

The sUAS GCS 242 may include one or more local processors 255 for carrying out the individual operations and functions of the sUAS GCS 242. The processor(s) 255 may reference, for example, each input from the user (operator or pilot) to formulate and send signals for controlling operation of the sUAS platform 202 according to the user inputs. Separately or additionally, the processor(s) 255 may collect and collate data received from the sUAS platform 202 or other data autonomously received by the sUAS GCS 242. The processor(s) 255 may integrate and format the collected and collated data in a manner that the collected and collated data can be transmitted via, for example, a data exchange device 290 to (1) other sUAS GCSs operating in a vicinity of the sUAS GCS 242 or to one or more remote stakeholder situational awareness display facilities (see FIG. 1).

The sUAS GCS 242 may include one or more data storage devices 260. Such data storage device(s) 260 may be used to store data or operating programs to be used by the sUAS GCS 242, and specifically the processor(s) 255 in carrying into effect the disclosed operations and functions of the sUAS GCS 242. Data storage device(s) 260 may be used to store collected, collated, integrated and/or fused information that may include collected ADS-B position information for cooperating aircraft in a vicinity of the sUAS platform 202, and telemetry data for the sUAS platform 202, including position data for the sUAS platform 202.

The data storage device(s) 260 may include a random access memory (RAM) or another type of dynamic storage device that is capable of storing updatable data information, and for separately storing instructions for execution of system operations by, for example, processor(s) 255. Data storage device(s) 260 may also include a read-only memory (ROM), which may include a conventional ROM device or another type of static storage device that stores static information and instructions for processor(s) 255. Further, the data storage device(s) 260 may be integral to the sUAS GCS 242, or may be provided external to, and in wired or wireless communication with, the sUAS GCS 242, including as cloud-based storage and/or processing elements.

The sUAS GCS 242 may include at least one data display device 265, which may be configured as one or more conventional mechanisms that output information to a user (operator or pilot), including, but not limited to, a display screen on a GUI associated with the sUAS GCS 242 to provide a graphical depiction of the sUAS platform 202 being controlled by the sUAS GCS 242 and other sUAS platforms and cooperating manned aircraft operating in a vicinity of the sUAS platform 202. The at least one data display device 265 may, therefore, operate as a local situational awareness display device for the operator and/or pilot of the sUAS platform 202 controlling the operations of the sUAS platform 202 via the sUAS GCS 242. The data display device 265 may also be in the form of a wearable device for the operator/pilot.

The sUAS GCS 242 may include an sUAS control device 270. The sUAS control device 270 may be a function of the processor 255 in communication with the data storage device 260 or may be a stand-alone device or unit within, or associated with, the sUAS GCS 242. When a stand-alone device or unit, the sUAS control device 270 may itself reference information from other components, including but not limited to the operating interface 250, to facilitate manual, semi-automated or automated control of the sUAS platform 202 associated with, and controlled by, the sUAS GCS 242 throughout a flight profile of the sUAS platform 202.

The sUAS GCS 242 may include a small and/or lightweight ADS-B receiver 275 attached to, and/or in communication with, the sUAS GCS 242. The sUAS GCS-associated ADS-B receiver 275 may be usable to collect ADS-B information on both reporting frequencies, as discussed in detail above, to discern position information for cooperating manned aircraft equipped with ADS-B transceivers operating in a vicinity of the sUAS platform 202.

In embodiments in which the ADS-B receiver 275 is mounted on the sUAS GCS 242, a data fusion device 280 and/or a fused data translator 285 may be provided. One or both of the data fusion device 280 and the fused data translator 285 may be provided as a function of the processor 255 in communication with the data storage device 260, or may be a stand-alone device or unit within, or associated with, the sUAS GCS 242. The data fusion device 280 may provide integration of position data for the sUAS platform 202 and ADS-B data collected from cooperating manned aircraft in a vicinity of the sUAS GCS 242. This integrated data may be manipulated, translated and/or formatted by the fused data translator 285 for exchange of the integrated data, as manipulated, translated and/or formatted for direct integration on the data display device 265 of the sUAS GCS 242. The data may be fused and formatted for delivery via a data exchange device 290 in a manner that facilitates direct integration of the data in a graphical display onto a situational awareness display of one or more remote stakeholders. The data exchange device 290 thus provides the output conduit by which the sUAS GCS 242 may communicate with a remote stakeholder situational awareness facility (see FIG. 1).

Figure 3:
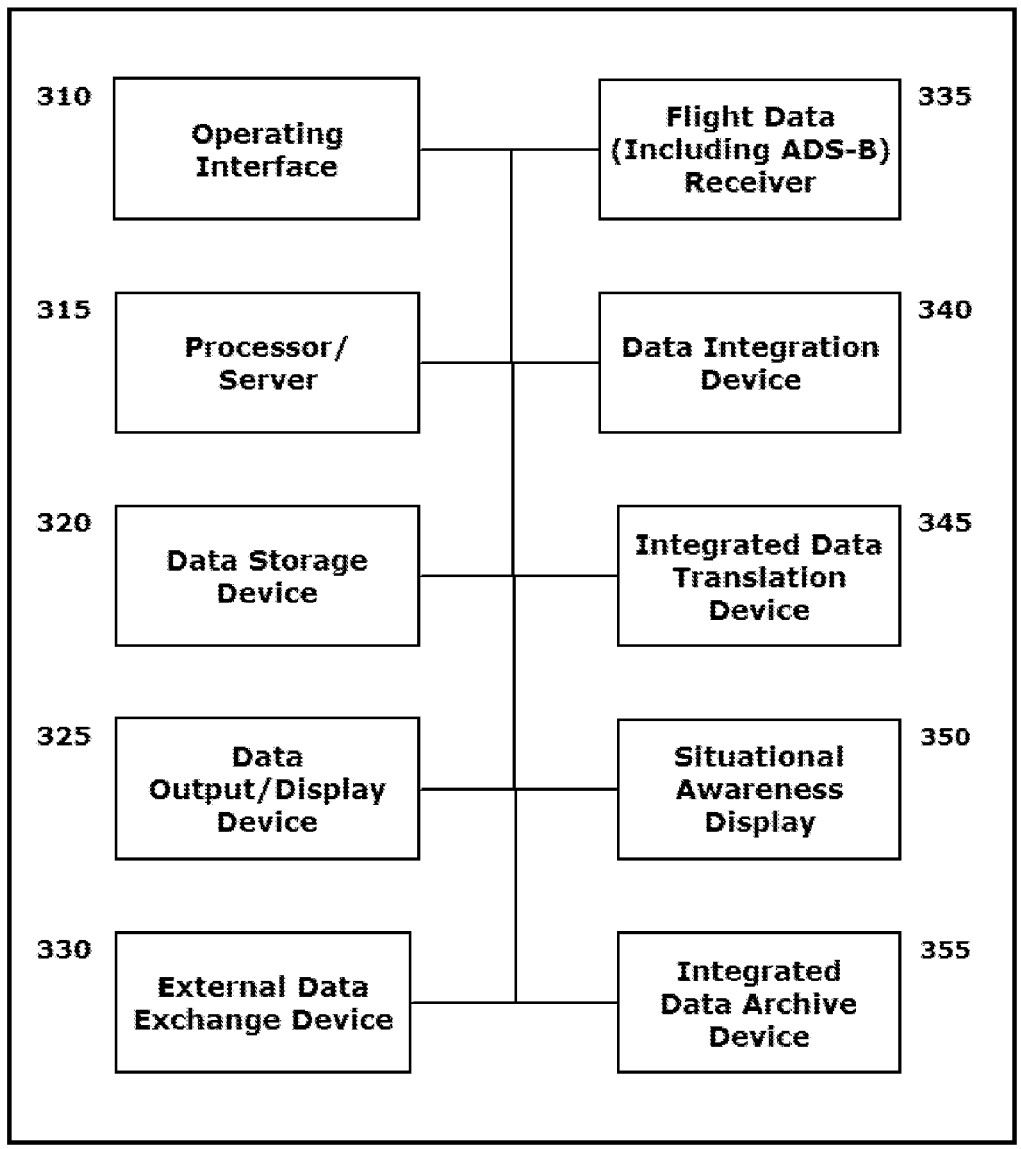
FIG. 3 illustrates an exemplary embodiment of a remote stakeholder situational awareness facility provided as a receiving component of a communication network in which the ADS-B supplemented tracking schemes according to this disclosure may be implemented.

FIG. 3 illustrates an exemplary embodiment of a remote stakeholder situational awareness facility 300 provided as a receiving component of a communication network in which the ADS-B supplemented tracking schemes according to this disclosure may be implemented.

The exemplary facility 300 may include its own operating interface 310 by which a stakeholder overseeing the exemplary facility 300 may communicate with other components in the exemplary facility 300 to support display of a situational awareness picture including information received from one or more ADS-B augmented sUAS GCSs. This operating interface 310 may be in any of the configurations described above with respect to the operating interface 250 in the sUAS GCS 242.

The exemplary facility 300 may include one or more local processors/servers 315 for carrying out the individual operations and functions of the exemplary facility 300. The processor/server 315 may reference, for example, positional information for cooperating sUAS platforms and manned aircraft in a vicinity of the cooperating sUAS platforms. The positional information may arrive at the processor/server 315 pre-integrated, pre-fused and/or pre-translated. Otherwise, the positional information may arrive at the processor/server 315 as raw data to be integrated, fused and/or translated in the processor/server 315 in the manner described above. Additionally, the processor/server 315 may select appropriate elements of the positional information for the different participating aerial vehicles and archive one or more of individual aerial vehicle positional information, and/or the positional information for the multiplicity of participating aerial vehicles.

The exemplary facility 300 may include one or more data storage devices 320. Such data storage device(s) 320 may be used to store selected elements of raw positional information, and/or integrated, fused and/or translated positional information for a multiplicity of participating aerial vehicles with which the exemplary facility 300 may be in direct, or indirect data communication. See, e.g., FIG. 1. The data storage devices 320 may separately or additionally store data or operating programs to be used by the exemplary facility 300, and specifically the processor(s) 315 in carrying into effect the disclosed operations and functions. Data storage device(s) 320 may be used, for example, to store formatting information to be forwarded directly to a situational awareness display 350 in the exemplary facility 300, or to be exported to display devices of other stakeholders in a manner that provides for direct integration of a graphical data/map display for respective end-users (stakeholders). The data storage device(s) 320 may individually be configured as described above with respect to data storage device(s) 260 in the sUAS GCS 260 See FIG. 2.

The exemplary facility 300 may include a single data output/display device 325 that may be usable to display information and/or commands for carrying into effect the operations and functions of the exemplary facility 300. The single data output/display device 325 may be additionally usable to display situational awareness information based on individual aerial vehicle positional information received in the exemplary facility 300, or based on integrated, fused and/or translated positional information for a multiplicity of aerial vehicles in a particular area. Separately, such a situational awareness display 350 may be provided separately within the exemplary facility 300. In either embodiment, a respective display device may be according to any one or more conventional mechanisms that visually output information to a user such as, for example, a remote stakeholder and/or mission controller that may benefit from interpretation of situational awareness information presented on a display device.

The exemplary facility 300 may include at least one external data exchange device 330 specifically configured to provide streamlined communication with fielded units for the collection of positional information data. Separately, the external data exchange device 330 may provide the medium by which the exemplary facility 300 communicates integrated, fused and/or translated positional information for a multiplicity of aerial vehicles in a particular area to individual stakeholders with an interest in being provided the situational awareness display of such information.

The exemplary facility 300 may include its own autonomous flight data receivers 335, including, for example, ADS-B receivers. The exemplary facility 300 may employ data separately recovered through its autonomous paths to supplemental or augment the raw positional information or the pre-integrated, pre-fused and/or pre-translated positional information from other sources with which the exemplary facility 300 is in communication in order to provide a more complete situational awareness display of operations of a multiplicity of aerial vehicles in a particular area.

The exemplary facility 300 may include, as separate processing functions and/or stand-alone devices a data integration device 340 and an integrated data translation device 345 to produce the integrated, fused and/or translated positional information data on the multiplicity of aerial vehicles in a particular area in a manner that may be directly input into a local or remote situational awareness display 350.

The exemplary facility 300 may also include, internally, or externally and in that a communication with the exemplary facility 300, an integrated data archive device 355 to provide a repository for integrated aerial vehicle position information to be referenced at a later time to any beneficial purpose.

All of the various components of the exemplary sUAS system 200, as depicted in FIG. 2, and/or of the exemplary facility 300, as depicted in FIG. 3, may be connected internally to each other, via combinations of wired and wireless communication pathways to facilitate data, messaging and control exchange between the various components of the disclosed system and facility.

It should be appreciated that, although depicted in FIGS. 2 and 3 as a series of separate discrete units with specific operating functionalities, the various disclosed elements of the exemplary sUAS system 200 and the exemplary facility 300 may be arranged in any combination of sub-systems as individual components or combinations of components. In other words, no specific configuration is to be implied by the depiction in FIGS. 2 and 3. Further, although depicted as individual units for ease of understanding of the details provided in this disclosure regarding the exemplary sUAS system 200 components, and the exemplary facility components 300, it should be understood that the described functions of any of the individually-depicted components may be undertaken, for example, by one or more processors within, connected to, and/or in communication with the separate system components of exemplary sUAS system 200 and/or the exemplary facility 300.

Figure 4:
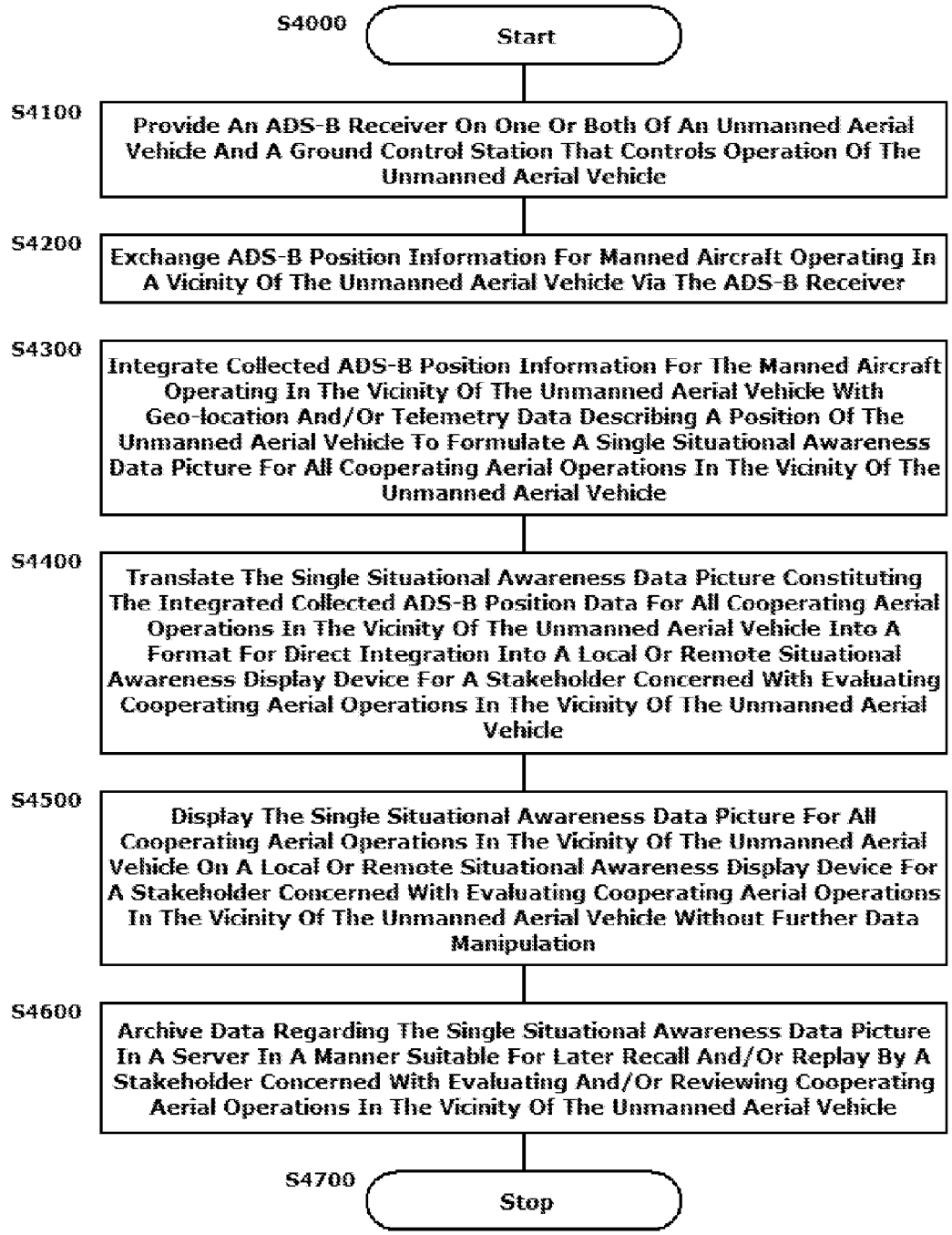
FIG. 4 illustrates a flowchart of an exemplary method for implementing an ADS-B supplemented tracking scheme according to this disclosure.

The disclosed embodiments may include an exemplary method an exemplary method for implementing an ADS-B supplemented tracking scheme. FIG. 4 illustrates an exemplary flowchart of such a method. As shown in FIG. 4, operation of the method commences at Step S4000 and proceeds to Step S4100.

In Step S4100, an ADS-B receiver may be provided on one or both of an unmanned aerial vehicle and a ground control station that controls operation of the unmanned aerial vehicle. Operation of the method proceeds to Step S4200.

In Step S4200, ADS-B position information (data) may be exchanged with one or more manned aircraft operating in a vicinity of the unmanned aerial vehicle. The ADS be position information may be received by the ground control station that controls operation of the unmanned aerial vehicle via the ADS-B receiver mounted on either of the unmanned aerial vehicle or the ground control station. Operation of the method proceeds to Step S4300.

In Step S4300, collected ADS-B position information for the manned aircraft operating in the vicinity of the unmanned aerial vehicle may be integrated with geolocation data and/or telemetry data describing a position of the unmanned aerial vehicle. This integration is expected to produce and/or formulate a single situational awareness data picture for all cooperating manned aircraft (all cooperating aerial operations) in a vicinity of the unmanned aerial vehicle. Operation of the method proceeds to Step S4400.

In Step S4400, the single situational awareness data picture constituting integrated collected ADS-B position data for all cooperating aerial operations in the vicinity of the unmanned aerial vehicle may be translated into a format that promotes direct integration of the data into a local or remote situational awareness display device for a stakeholder concern with evaluating cooperating aerial operations in the vicinity of the unmanned aerial vehicle. The local or remote situational awareness display device may be a display device incorporated in the ground control station, or may be a situational awareness device provided in a facility for tracking of aerial operations local to a particular one or more unmanned aerial vehicles. Operation of the method proceeds to Step S4500.

In Step S4500, the single situational awareness data picture for all cooperating aerial operations in the vicinity of the unmanned aerial vehicle(s) may be displayed on the local or remote situational awareness display device without further data manipulation in order to display the single situational awareness data picture in a format compatible with the local or remote situational awareness display device. Operation of the method proceeds to Step S4600.

In Step S4600, data regarding the single situational awareness data picture may be archived in a server or memory device in a manner suitable for later recall and/or replay by a stakeholder concern with evaluating and/or reviewing cooperating aerial operations in the vicinity of the unmanned aerial vehicle. Operation of the method proceeds to Step S4700, where operation of the method ceases.

The disclosed embodiments may include a non-transitory computer-readable medium storing instructions which, when executed by a processor in one or more of an sUAS system ground control station, or a remote stakeholder situational awareness facility may cause the respective processor to execute all, or at least some, of the steps of the method outlined above.

The above-described exemplary systems and methods reference certain conventional components to provide a brief, general description of suitable operating environments in which the subject matter of this disclosure may be implemented for familiarity and ease of understanding. Although not required, embodiments of the disclosed systems, and implementations of the disclosed methods, may be provided, at least in part, in a form of hardware circuits, firmware, or software computer-executable instructions to carry out the specific functions described. The hardware circuits, firmware, or software-executable instructions may include individual program modules executed by the one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in integrating operations of one or more unmanned aerial vehicles with ADS-B equipped manned aircraft operating in a vicinity of the unmanned aerial vehicles to promote flight deconfliction and flight safety. Those skilled in the art further understand that no particular combination of individual unmanned aerial vehicles or cooperating manned aircraft is implied for tracking and deconfliction, as well as for mission/event reconstruction.

As indicated above, embodiments within the scope of this disclosure may include computer-readable media having stored computer-executable instructions or data structures that may be accessed, read and executed by one or more processors in differing devices, as described. Such computer-readable media can be any available media that can be accessed by a processor, general purpose or special purpose computer. By way of example, and not limitation, such computer-readable media may comprise RAM, ROM, EEPROM, CD-ROM, flash drives, data memory cards or other analog or digital data storage devices that may be used to carry or store desired program elements or steps in the form of accessible computer-executable instructions or data structures. When information is transferred or provided over a network or another communication connection, whether wired, wireless, or in some combination of the two, the receiving processor may properly view the connection as a computer-readable medium. Thus, any such connection is properly termed a computer-readable medium. Combinations of the above should also be included within the scope of the computer-readable media for the purposes of this disclosure.

Computer-executable instructions may include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions, or associated data structures, represents one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 4, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual user, unmanned aerial vehicle operator, mission controller and/or other remote stakeholder, where each user may individually employ components of the disclosed systems and methods to their advantage. This enables each user to enjoy the benefits of the disclosed embodiments even if any one of the large number of possible applications do not need some portion of the described functionality. In other words, there may be multiple instances of the disclosed systems each processing the content in various possible ways. It does not necessarily need to be one system used by all end users. Accordingly, the appended claims, and their legal equivalents, should only define the disclosed embodiments, rather than any specific example given.

We claim:

1. A Ground Control Station (GCS) that controls flight operations of at least one small Unmanned Aerial System (sUAS) platform, comprising:
    a first communication unit that receives at least one of flight telemetry data and position reference data from the at least one sUAS platform that the GCS controls;
    a second communication unit that receives Automatic Dependent Surveillance-Broadcast (ADS-B) messages from ADS-B-equipped aircraft;
    an information extraction unit that extracts (1) a geographic position of the at least one sUAS platform that the GCS controls from the at least one of the received flight telemetry data and position reference data for the sUAS platform and (2) a geographic position of the ADS-B-equipped aircraft from the ADS-B message; and
    a third communication unit that reports the geographic position of the at least one sUAS platform that the GCS controls and the geographic position of the ADS-B-equipped aircraft to at least one other GCS that does not control the at least one sUAS platform for display on the at least one other GCS and a remote facility for display on a situational awareness display device in the remote facility.

2. The GCS of claim 1, further comprising a position data integration device that integrates the geographic position of the at least one sUAS platform that the GCS controls and the geographic position of the ADS-B-equipped aircraft as a single geographic position map representing the geographic position of the at least one sUAS platform that the GCS controls and the geographic position of the ADS-B-equipped aircraft for display.

3. The GCS of claim 2, further comprising a data translation device that translates the single geographic position map to a format that is compatible for direct integration into a display component of the at least one other GCS and the situational awareness display device in the remote facility.

4. The GCS of claim 1, the second communication unit being mounted on the GCS.

5. The GCS of claim 1, the second communication unit being mounted on the at least one sUAS platform that the GCS controls, and forwarding the received ADS-B messages to the GCS via the first communication unit.

6. The GCS of claim 1, the second communication unit receiving ADS-B messages communicated via a 1090 MHz signal.

7. The GCS of claim 1, the second communication unit receiving ADS-B messages communicated via a 978 MHz signal.

8. The GCS of claim 7, the ADS-B messages including weather information.

9. The GCS of claim 1, the third communication unit reporting the geographic position of the at least one sUAS platform that the GCS controls and the geographic position of the ADS-B-equipped aircraft using Web Services.

10. The GCS of claim 9, the Web Services including HTTP/HTTPS over TCP/IP.

11. The GCS of claim 1, the third communication unit being a mobile communicating device.

12. The GCS of claim 11, the mobile communicating device operating according to one of 3G, a 4G or an LTE communication protocol.

13. An aerial vehicle situational awareness display system, comprising:
 a communication interface that establishes communication with at least one sUAS, the at least one sUAS including a GCS that controls operation of at least one sUAS platform, the at least one sUAS including an ADS-B receiver;
 an aircraft information server that is located remotely from the at least one sUAS, the aircraft information server being programmed to:
  receive at least one of flight telemetry data and position reference data for the sUAS platform that the GCS controls from the GCS;
  extract a geographic position of the at least one sUAS platform that the GCS controls from the at least one of the received flight telemetry data and position reference data for the at least one sUAS platform;
  receive ADS-B messages from ADS-B-equipped aircraft operating in a vicinity of the at least one sUAS via the ADS-B receiver included with the at least one sUAS;
  extract geographic positions of the ADS-B-equipped aircraft from the received ADS-B messages;
  integrate the extracted geographic position for the at least one sUAS platform and the extracted geographic positions for the ADS-B equipped aircraft into a graphical representation of aerial vehicles in a vicinity of the at least one sUAS; and
 a situational awareness display device that displays the graphical representation of the aerial vehicles.

14. The system of claim 13, the aircraft information server being further programmed to:
 receive a planned route of flight for the at least one sUAS platform; and
 integrate a graphical depiction of the planned route of flight for the at least one sUAS platform into the graphical representation of the aerial vehicles in a vicinity of the at least one sUAS for display on the situational awareness display device.

15. The system of claim 13, the aircraft information server being further programmed to:
 translate the graphical representation of the aerial vehicles in a vicinity of the at least one sUAS to a format that is compatible for direct integration into a display component of at least one of another sUAS and a situational awareness display device in a remote facility; and
 export the translated graphical representation of the aerial vehicles in a vicinity of the at least one sUAS to the at least one of the another sUAS and the situational awareness display device in a remote facility.

16. The system of claim 13, the ADS-B receiver included with the at least one sUAS being mounted on the GCS.

17. The system of claim 13, the ADS-B receiver included with the at least one sUAS being mounted on the at least one sUAS platform that the GCS controls, the received ADS-B messages being forwarded to the GCS via a separate communication device in the GCS.

18. The system of claim 13, the ADS-B receiver receiving ADS-B messages communicated via both a 1090 MHz signal and a 978 MHz signal, the 978 MHz signal including ADS-B messages with weather information.

19. The system of claim 13, the communication interface communicating with the at least one sUAS using Web Services including HTTP/HTTPS over TCP/IP.

20. The system of claim 13, the communication interface communicating with the at least one sUAS via a mobile communicating device, the mobile communicating device operating according to one of 3G, a 4G or an LTE communication protocol.

21. A method for remotely tracking aerial vehicles on an aerial vehicle situational awareness display, comprising:
 receiving, in an sUAS GCS, at least one of flight telemetry data and position reference data from at least one sUAS platform that the sUAS GCS controls;
 receiving, in the sUAS GCS, ADS-B messages from ADS-B-equipped aircraft operating in a vicinity of the sUAS GCS;
 extracting, by a processor, a geographic position of the at least one sUAS platform that the sUAS GCS controls from the at least one of the received flight telemetry data and position reference data for the sUAS platform;
 extracting, by the processor, a geographic position of the ADS-B-equipped aircraft operating in a vicinity of the sUAS GCS from the ADS-B messages;
 integrating the extracted geographic position for the at least one sUAS platform and the extracted geographic positions for the ADS-B equipped aircraft operating in a vicinity of the sUAS GCS into a graphical representation of aerial vehicles in a vicinity of the at least one sUAS;
 reporting the extracted geographic position of the at least one sUAS platform and the extracted geographic position for the ADS-B-equipped aircraft to at least one other GCS that does not control the at least one sUAS platform for display on the at least one other GCS and to a remote facility for display on a situational awareness display device in the remote facility; and
 displaying the graphical representation of the aerial vehicles on the at least one other GCS and the situational awareness display device in the remote facility.

* * * * *